United States Patent
Sherlock

[15] 3,686,406
[45] Aug. 22, 1972

[54] PROCESS FOR ALLEVIATING PAIN
[72] Inventor: Margaret H. Sherlock, 34 Parkway W., Bloomfield, N.J. 07003
[73] Assignee: Schering Corporation, Bloomfield, N.J.
[22] Filed: Sept. 18, 1970
[21] Appl. No.: 73,659

Related U.S. Application Data

[60] Division of Ser. No. 866,012, Oct. 13, 1969, abandoned, which is a continuation-in-part of Ser. No. 835,743, June 23, 1969, abandoned.

[52] U.S. Cl. .................................................424/266
[51] Int. Cl. ............................................A61k 27/00
[58] Field of Search........................................424/266

[56] References Cited

UNITED STATES PATENTS 3,415,834   12/1968   Hoffmann et al.......260/295.5

*Primary Examiner*—Jerome D. Goldberg
*Attorney*—Stephen B. Coan and Raymond A. McDonald

[57] ABSTRACT

This invention relates to 2-(2-methylanilino)-nicotinic acid, the non-toxic pharmaceutically acceptable salts thereof and to the methods for the preparation and use thereof.

The tangible embodiments of this invention are prepared by condensing a 2-halonicotinic acid, or a functionally reactive equivalent thereof, with an o-toluidine, or a functionally reactive equivalent thereof, to produce either 2-(2-methylanilino)-nicotinic acid or a derivative which is convertible thereinto.

3 Claims, No Drawings

PROCESS FOR ALLEVIATING PAIN

This application is a divisional application of my application Ser. No. 866,012, filed Oct. 13, 1969, now abandoned, which in turn was a continuation-in-part of my application Ser. No. 835,743, filed June 23, 1969, now abandoned.

The invention sought to be patented in one of its composition of matter aspects is described as residing in the concept of having the molecular structure of 2-(2-methylanilino)-nicotinic acid, including the non-toxic pharmaceutically acceptable salts thereof.

The invention sought to be patented in another of its composition of matter aspects resides in the concept of pharmaceutical dosage forms containing a novel compound of this invention.

The invention sought to be patented in one of its process aspects is described as residing in the concept of producing analgesia upon the administration of a therapeutically effective quantity of the novel compounds of this invention.

In another of its process aspects, the invention sought to be patented resides in the concept of condensing a 2halo-nicotinic acid or a functionally reactive equivalent thereof with an o-toluidine or a functionally reactive equivalent thereof to produce either 2-(2-methylanilino)-nicotinic acid or a derivative which is convertible thereinto.

The compounds are preferably prepared by heating together a 2-halo (preferably chloro or bromo) nicotinic acid with an o-toluidine, said heating taking place in either a high boiling solvent such as xylene or cymene, or by merely melting the reactants in the presence of each other. In the melt procedure, the reaction temperature will rise as the reaction proceeds. The reaction is completed generally after 15–30 minutes and is evidenced by a fall in the reaction temperature. The fused melt is then treated with a dilute aqueous base, such as for example, sodium carbonate or sodium hydroxide, and is extracted with a water immiscible solvent. The product, in the form of the soluble salt, is in the aqueous layer and is precipitated therefrom by acidifying with a dilute mineral acid and it is then filtered.

Alternatively, a lower alkyl ester of the 2-halo-nicotinic acid may be employed as a reactant, said reactant being condensed with the toluidine moiety. The ester group is subsequently hydrolyzed. In some instances hydrolysis may occur during the reaction but the alcohol produced does not interfere with the desired reaction and is easily removed during isolation and purification.

In addition to the use of the reactants employed in the above-described reactions, other equivalently functioning reactants may be employed to produce the desired novel compositions of this invention. For example, instead of employing a 2-halo-nicotinic acid (or ester thereof), a nicotinic acid (or ester thereof) having an alkoxy, alkylthio, methylsulfonyl, nitro or other equivalently functioning substituent in the 2-position thereof may be so employed. In such instances, the same reaction conditions used in the previous reactions would be employed. Alternatively, an N-substituted o-toluidine reactant may be heated with the foregoing 2-substituted nicotinic acids (or esters thereof) instead of employing the previously described o-toluidine. Such equivalently functioning N-substituted o-toluidine reactants include those o-toluidines wherein a hydrogen atom attached to the nitrogen atom has been replaced with substituents such as benzyl, lower alkyl or acyl. Again, in the use of these equivalently functioning reactants the previously described reaction conditions would be employed. In those instances wherein the N-substituted o-toluidine reactant has been employed, the 2-(N-substituted-2-methylanilino)-nicotinic acid (or ester thereof) may be subjected to standard procedures to remove the benzyl, lower alkyl and acyl radicals from the nitrogen atom. The preferred reaction may be summarized by the following schematic representation:

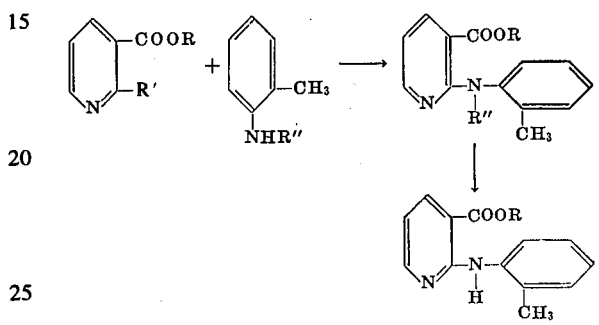

wherein R is a member of the group consisting of hydrogen and lower alkyl; R' is a member of the group consisting of alkoxy, alkythio, methylsulfonyl and nitro; and R" is a member of the group consisting of lower alkyl, benzyl and acyl.

Alternatively, the compounds embraced within the concepts of this invention may also be prepared from 2-amino nicotinic acid (or ester thereof) by means of a nucleophilic displacement reaction with an o-tylylhalide. The preparation of these compounds by this route is affected in the same manner as in the previously described displacement reaction.

The foregoing reaction may be summarized by the following schematic representation:

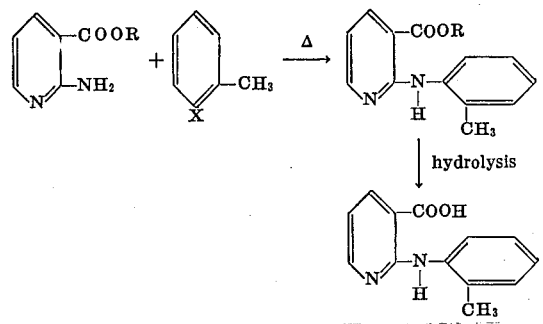

wherein R is as previously defined and X is halogen, but preferably bromo or iodo.

Similarly the carboxyl moiety of the nicotinic acid may be replaced with a cyano radical and the 3-cyano-2-halo-pyridine, or other functionally reactive equivalent thereof, is condensed with an appropriate o-toluidine or other functionally reactive equivalent thereof. Following the condensation, the cyano radical is chemically transformed into the desired carboxyl radical.

The following examples are illustrative of the methods of synthesis of the tangible embodiments of this invention.

EXAMPLE 1

2-(2-Methylanilino)-nicotinic Acid

A. Ethyl-2-(2-methylanilino)-nicotinate

Heat a mixture of 44 g. of o-toluidine and 37 g. of ethyl 2-chloronicotinate at about 210°–240° C for 15 minutes. Cool the reaction mixture and dilute with 600 ml. of ether and remove the o-toluidine hydrochloride by filtration. Concentrate the ether layer and triturate the residue with petroleum ether and filter. Recrystallize from petroleum ether yielding ethyl-2-(2-methylanilino)-nicotinate, m.p. 59°–60° C.

B. 2-(2-Methylanilino)-nicotinic Acid

Reflux a solution of 32 g. of ethyl 2-(2-methylanilino)-nicotinate in 250 ml. of ethanol containing 124 ml. of 40 percent sodium hydroxide for 8 hours. Remove the excess alcohol and neutralize with dilute hydrochloric acid. Filter and dry the neutralized product. Recrystallize from acetonitrile giving 2-(2-methylanilino)-nicotinic acid, m.p. 167°–168° C as a yellow solid.

EXAMPLE 2

2-(2-Methylanilino)-nicotinic Acid

Heat a mixture of 9.4 g. of 2-chloronicotinic acid and 12.9 g. of o-toluidine to 160° C in a metal bath. Covering the vessel, a vigorous reaction ensues with the temperature of the reaction mixture rising to 230° C. The reaction is completed in approximately 15 minutes and the completion is evidenced by a drop in the temperature of the reaction mixture. Extract and dilute the product of the reaction with dilute sodium hydroxide solution and benzene. Separate the aqueous basic layer and neutralize with dilute hydrochloric acid and filter to give 2-(2-methylanilino)-nicotinic acid.

The tangible embodiments of this invention are acids, and are soluble in aqueous alkali. The alkali and the alkaline earth metal and amine salts of the novel compound may be prepared by methods well known in the art for the preparation of a salt of a strong base with a weak acid. For example, the alkali metal salt, preferably the sodium salt, may be obtained by evaporation of an alkaline solution (e.g. with sodium hydroxide) of the anilino-nicotinic acid described herein. Alternatively, non-aqueous media may be employed. For example, by mixing an alcoholic solution of the anilino-nicotinic acid together with an alcoholic solution containing a stoichiometric quantity of an alkali metal alkoxide and after evaporating the solvent, there is obtained the alkali metal salt which is soluble in water. In a similar fashion and by other known techniques other functional derivatives (i.e. other pharmaceutically acceptable salts) are prepared. Representative of such salts are, in addition to sodium, those wherein the cation is ammonium, diethanol ammonium, potassium, lithium, calcium, aluminum and other such metals which advantageously allow for greater solubility or greater ease in formulation and are considered the full equivalent of the free carboxylic acid. Also included within this class of functional derivatives are the (hydroxamic) acid derivatives which are obtained by the condensation of an alkyl ester of the hereinabove described anilinonicotinic acid with hydroxylamine hydrochloride in the presence of sodium methoxide.

The tangible embodiments of the invention, in the form of the free acid or non-toxic pharmaceutically acceptable salt thereof, possess the inherent applied use characteristic of exerting an analgesic effect as determined by standard laboratory test procedures. Thus, the compounds of this invention are useful in treating pain.

It is known that certain anilino nicotinic acids may produce analgesia but there is associated with them a concomitant anti-inflammatory activity. Indeed, the anilino nicotinic acids under study today indicate that they are primarily useful as anti-inflammatory agents and only secondarily, if at all, are they considered as analgesics. Quite unexpectedly, it has been found that 2-(2-methylanilino)-nicotinic acid and the non-toxic pharmaceutically acceptable salts thereof exhibit significant analgesic activity without concomitant anti-inflammatory or ulcerogenic effects. Thus, these compositions of matter are extremely useful in those conditions wherein only analgesic therapy is indicated such as, for example, fractures, trauma, and toothache as well as the usual conditions for which analgesic therapy is indicated.

Based upon standard laboratory assay tests (e.g. the yeast paw test) it has been determined that an analgesic effect suitable for the alleviation of pain is achieved when the compound of this invention is administered to mammals in a dosage range of about 10 mg. per kg. to about 40 mg. per kg. of body weight per day.

In their functions as therapeutically useful compounds, it is advantageous to administer the compounds to the host animal in admixture with an acceptable pharmaceutical carrier suitable for enteral or parenteral administration, said carrier constituting a major portion of the admixture. Such preparations may be in such forms as, for example, tablets, capsules and suppositories, or in liquid forms, as for example, elixirs, emulsions, sprays and injectables. In the formulation of pharmaceutical preparations there can be employed such substances which do not react with the active substance, as for example, water, gelatin, lactose, starches, magnesium stearate, talc, vegetable oils, benzyl alcohols, gums, polyalkylene glycols, petroleum jelly and the like. The active ingredient of such pharmaceutical preparations is preferably present in the preparations in such proportions by weight that the proportion by weight of the active ingredient to be administered lies between 0.1 and 50 percent.

TABLET FORMULATION

The following formulation provides for the manufacture of 1000 tablets:

|     |                                   | Grams |
|-----|-----------------------------------|-------|
| (1) | 2-(2-methylanilino)-nicotinic acid | 25.0  |
| (2) | Lactose, U.S.P.                   | 181.0 |
| (3) | Corn Starch, U.S.P.               | 92.5  |
| (4) | Magnesium Stearate                | 1.5   |

Thoroughly granulate a mixture of 72.5 g. of corn starch and the lactose with a paste prepared by dissolving 20 g. of corn starch in 100 ml. of hot distilled water. Dry the resulting granulation, add a blended mixture of the active ingredient (1) and the magnesium stearate. Thoroughly blend and then press into tablets of 300 mg. each.

CAPSULE FORMULATION

The following formulation provides for the manufacture of 1000 capsules:

|     |                                    | Grams |
|-----|------------------------------------|-------|
| (1) | 2-(2-methylanilino)-nicotinic acid | 25.0  |
| (2) | Lactose                            | 273.5 |
| (3) | Magnesium Stearate                 | 1.5   |

Mix active ingredient (1) with the lactose and blend in the magnesium stearate. Fill hard gelatin capsules with 300 mg. each of the blended mixture to produce capsules containing 25 mg. of 2-(2-methylanilino)-nicotinic acid.

PARENTERAL FORMULATION

The following formulation provides for the manufacture of 1000 vials each containing 10 mg. of active ingredient, as the sodium salt.

| (1) | 2-(2-methylanilino)-nicotinic acid (sodium salt) | 10.95 g. |
|-----|--------------------------------------------------|----------|
| (2) | Monobasic potassium phosphate                    | 6.00 g.  |
| (3) | Water for injection U.S.P. g.s....ad             | 1.00 l.  |

Dissolve ingredients (1), (2) and (3) in approximately 80 percent of the volume of water and filter the resulting solution. Add to the filtrate sufficient water to bring up to a 1000 ml. volume. Sterile-filter the solution and aseptically fill one milliliter portions of the solution into 2 milliliter vials, then lyophilize. After the lyophilized cake is dry, aseptically stopper the vials with rubber plugs and seal.

I claim:

1. The process for alleviating pain which comprises administering to an animal suffering from pain, a therapeutically effective pain relieving quantity of 2-(2-methylanilino)-nicotinic acid or the non-toxic pharmaceutically acceptable salts thereof.

2. The process of claim 1 wherein said compound is 2-(2-methylanilino)-nicotinic acid.

3. The process of claim 1 wherein said compound is a non-toxic pharmaceutically acceptable salt of 2-(2-methyl-anilino)-nicotinic acid.

* * * * *